United States Patent [19]

Allan

[11] 4,225,549
[45] Sep. 30, 1980

[54] METHOD TO INCREASE THE HEAT DEFLECTION TEMPERATURE OF AMORPHOUS POLYETHYLENE TEREPHTHALATE

[75] Inventor: David R. Allan, Atlanta, Ga.

[73] Assignee: The Mead Corporation, Dayton, Ohio

[21] Appl. No.: 58,749

[22] Filed: Jul. 18, 1979

[51] Int. Cl.$^2$ .............................................. B29C 25/00
[52] U.S. Cl. .................................... 264/234; 264/87; 264/345; 264/346; 528/272; 528/309; 528/480
[58] Field of Search ................. 264/234, 87, 345, 346; 528/272, 309, 480

[56] References Cited

U.S. PATENT DOCUMENTS

| | | | |
|---|---|---|---|
| 3,808,301 | 4/1974 | Pruden | 264/80 |
| 3,873,664 | 3/1975 | Curtis et al. | 264/146 |
| 3,957,941 | 5/1976 | Kawaguchi | 264/234 |

*Primary Examiner*—Lucille M. Phynes
*Attorney, Agent, or Firm*—Earl B. Brookbank, Jr.

[57] ABSTRACT

The heat deflection temperature of amorphous thermoformed polyethylene terephthalate is increased by removing absorbed and/or adsorbed water therefrom, as by heating in an oven, or by desiccation. Following drying, the material is kept in a desiccated storage vessel until time of use.

9 Claims, No Drawings

METHOD TO INCREASE THE HEAT DEFLECTION TEMPERATURE OF AMORPHOUS POLYETHYLENE TEREPHTHALATE

BACKGROUND OF THE INVENTION

This invention is a process for increasing the heat deflection temperature of plastic cups made from amorphous polyethylene terephthalate. Such cups are generally thermoformed from sheet material, under conditions which result in the polyethylene terephthalate existing in a largely amorphous state, the degree of crystallinity being quite low. As a consequence such cups have a low heat deflection temperature of about 155° F.

In using cups made of polyethylene terephthalate for terminal sterilization of foods it may be necessary to expose the cups to temperatures up to 250° F. for low acid foods and up to 212° F. for high acid foods. By contrast, in using cups made from polyethylene terephthalate for aseptic packaging of food products it is necessary to sterilize the cups prior to filling them with food. Sterilization for aseptic packaging may generally be carried out by subjecting the cups to contact with a hot liquid sterilizing agent. However, the temperature at which the sterilization is accomplished must be below the heat deflection temperature of the polyethylene terephthalate cup. Thus, using cups with a low heat deflection temperature requires a low sterilization temperature, and for the sterilization to be effective, extended time periods are required. Because of the logarithmic order of death of microorganisms as a function of temperature, if the heat deflection temperature of the cups could be raised to 170° F., sterilization time would be materially shortened, and the aseptic packaging operation speeded up significantly.

PRIOR ART

Applicant is unaware of any prior art which suggests the effect of small amounts of water on the heat deflection temperature of polyethylene terephthalate cups. While the action of organic plasticizers on the physical properties of the polymer are well known, the art is silent as to the action of adsorbed/absorbed water on such properties as tensile strength, melting temperature, crystallization, etc.

SUMMARY

Unexpectedly, I have found that removal of adsorbed and/or absorbed water from thermoformed polyethylene terephthalate cups results in a significant increase in the heat deflection temperature thereof. Apparently, such water functions as a plasticizer for the polyethylene terephthalate, thus facilitating molecular deflection as a function of temperature. Removal of water results in an increase in heat deflection temperature. The water may be removed by heating the cups to a temperature below the heat deflection temperature of the plastic for extended periods, or by storing cups under dry conditions (desiccation), or by combinations thereof. After treatment of cups to remove water therefrom, the cups must be stored under dry desiccated conditions to prevent reincorporation of water from the atmosphere or other external sources.

DETAILED DESCRIPTION OF THE INVENTION

In practice, amorphous thermoformed cups made from polyethylene terephthalate are inventoried at the site of an aseptic packaging operation. In preparation for initiation of packaging operations, a supply of the cups is placed in an oven at 150° F. for 4 hours, after which they may be transferred to a storage vessel, such as a fully enclosed chamber containing a desiccant such as calcium sulfate, calcium chloride, silica gel or the like to prevent reincorporation of water. If desired, such storage chamber may be provided with a mechanical desiccation system. Cups are transferred from the storage vessel to the cup feed station of the aseptic packaging machine as needed to operate the machine. The improved heat distortion temperature persists through the sterilizing step of the packaging machine operation, which is the only step where the cups encounter an elevated temperature. A decrease in heat deflection temperature after the packaging operation is of no consequence.

As used herein, heat deflection temperature is defined as that temperature at which noticeable distortion of cups is observed after a one-minute immersion in a constant temperature water bath.

The following examples are illustrative of the invention:

EXAMPLE 1

Cups thermoformed from polyethylene terephthalate were placed in a constant temperature oven maintained at 145° F. for various time intervals. After removal of the cups from the oven, heat deflection temperatures thereof were determined and compared to the heat deflection temperature of control cups (cups not subjected to oven heat treatment). The following results were observed:

| Cup No. | Time in Oven Hrs. @ 145° F. | Distortion, Amt. | Temp. of water bath Immersion- 1 min. |
|---|---|---|---|
| 1 | 2 | some | 170° F. |
| 2 | 0 | severe | 170° F. |
| 3 | 4 | very little if any | 170° F. |
| 4 | 4 | very little if any | 175° F. |
| 5 | 4 | some | 177° F. |
| 6 | 4 | severe | 180° F. |
| 7 | 0 | severe | 170° F. |
| 8 | 48 | very little if any | 170° F. |
| 9 | 48 | very little if any | 175° F. |
| 10 | 48 | some | 177° F. |
| 11 | 48 | severe | 180° F. |
| 12 | 0 | severe | 170° F. |

All of the foregoing cups were tested for heat deflection temperature within one hour after removal from the drying oven. Control cups number 2, 7 and 12 were tested at the same time as those subjected to oven treatment, but had not been placed in the drying oven.

Cups treated in the drying oven for 8 hours at 145° F. and tested for heat deflection temperature at 170° F. after varying periods in room air showed considerable distortion after 24 hours and severe distortion after 48 hours.

From the foregoing data, it is evident that an oven treatment of amorphous polyethylene terephthalate cups at 145° F. for four hours raises the heat deflection temperature thereof from 155° F. to 175° F. if tested promptly after removal from the oven. If allowed to stand in ambient air for 24 hours or more, the heat deflection temperature drops below 170° F.

It was determined that four hours treatment in a drying oven at 145° F. resulted in an average weight loss of 0.37%. The same cups, after standing in room air for 24 hours following the drying oven treatment showed a weight gain of 0.11%.

EXAMPLE 2

Amorphous thermoformed polyethylene terephthalate cups without prior heat treatment were stored in a desiccator at room temperature for 24 hours. Substantially identical improvement in heat deflection temperature was obtained as compared to oven treatment for four hours at 145° F., i.e., very little if any distortion at 175° F.

EXAMPLE 3

Approximately 1200 cups were heated to 150° F. for four hours, removed from the oven and placed in a plastic bag with a desiccant and the bag placed in a covered barrel. When tested for heat deflection temperature at 170° F., no distortion was observed for up to three minutes. Slight distortion was observed after four minutes. After six minutes at 170° F., distortion was extensive.

Heat treated cups were removed from desiccated storage and fed into an aseptic packaging machine of the type shown in co-pending application Ser. No. 973,618, filed Dec. 27, 1978, said application being assigned to the same assignee as this application. The sterilizing bath of the machine was operated at a temperature of 162° to 165° F. The speed of operation of the machine was such that the cups were exposed to the sterilizing temperature for about 2.5 minutes. None of the cups showed any distortion after one machine cycle, but a second cycle through the sterilizing bath showed considerable distortion of the cups.

In order to determine if steam and/or water vapor in the air surrounding the cup in-feed dispenser would result in reduced heat deflection temperature of the cups by pick up of water, cups were placed in water at 100° F. and tested for heat distortion at 170° F. after various time intervals. No distortion was observed after water immersion periods of up to 30 minutes. Immersion periods in excess of 30 minutes showed progressively more distortion, which became excessive after 75 minutes immersion. Immersion in water at 100° F. for four hours resulted in a heat deflection temperature of only 150° F.

Thus, the heat deflection temperature of amorphous polyethylene terephthalate cups can be increased by driving off trace amounts of moisture, either by heating or by desiccating, or both. Cups so treated will take up (absorb and/or adsorb) moisture from the atmosphere after treatment unless stored in a dry environment, which maintains the increased heat deflection temperature resulting from the drying and/or desiccating treatment.

From the foregoing, it is evident that the method of the invention permits the use of higher sterilization temperatures and attendent higher operating speeds for aseptic packaging machines.

What is claimed is:

1. Method to increase the heat deflection temperature of amorphous polyethylene terephthalate by removing water therefrom.

2. Method according to claim 1 wherein said water is removed by heating in an oven.

3. Method according to claim 2 wherein said heating is at a temperature of 145° F. to 150° F. for a time period of about 4 hours.

4. Method according to claim 1 wherein said water is removed by desiccating.

5. Method according to claim 4 wherein said desiccating extends for a period of about 24 hours.

6. Method according to claim 4 wherein said desiccating is conducted with a desiccant selected from calcium sulfate, calcium chloride and silica gel.

7. Method according to claim 1 wherein said polyethylene terephthalate, following removal of water therefrom, is stored in a closed desiccated vessel.

8. Method according to claim 7 wherein said desiccated vessel contains calcium sulfate, calcium chloride or silica gel, or is provided with mechanical desiccating means.

9. Method to increase the heat deflection temperature of amorphous polyethylene terephthalate cups from about 155° F. to 175° F. by heating said cups in an oven at a temperature of 145° F. to 150° F. for four hours to remove water therefrom and thereafter storing said cups in a closed desiccated vessel.

* * * * *